United States Patent [19]

Ohmori et al.

[11] Patent Number: 4,720,166

[45] Date of Patent: Jan. 19, 1988

[54] CLADDING MATERIALS FOR OPTICAL FIBERS

[75] Inventors: Akira Ohmori, Ibaraki; Nobuyuki Tomihashi, Takatsuki; Takahiro Kitahara, Settsu, all of Japan

[73] Assignee: Daikin Kogyo Co., Ltd., Japan

[21] Appl. No.: 890,458

[22] Filed: Jul. 30, 1986

Related U.S. Application Data

[63] Continuation-in-part of Ser. No. 720,455, Apr. 4, 1985, abandoned, which is a continuation of Ser. No. 617,474, Jun. 5, 1984, abandoned.

Foreign Application Priority Data

[30]

Jun. 10, 1983 [JP] Japan .................. 58-104550

[51] Int. Cl.⁴ .................................. G02B 6/18
[52] U.S. Cl. .................. 350/96.34; 526/245
[58] Field of Search ........... 350/96.29, 96.30, 96.33, 350/96.34; 526/245

[56] References Cited

U.S. PATENT DOCUMENTS

| | | | |
|---|---|---|---|
| 4,259,407 | 3/1981 | Tada | 428/421 |
| 4,566,755 | 1/1986 | Ohmori | 350/96.34 |
| 4,615,584 | 10/1986 | Ohmori | 350/96.34 |

*Primary Examiner*—Christopher Henderson
*Attorney, Agent, or Firm*—Larson and Taylor

[57] ABSTRACT

This invention provides a cladding material in an optical fiber which comprises a polymer comprising:
(1) a structural unit represented by the formula

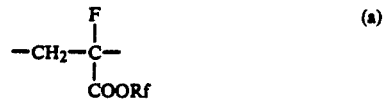

and
(2) at least one of structural unit
(i)

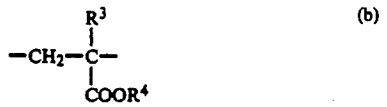

and
(ii)

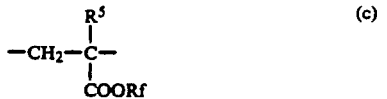

2 Claims, No Drawings

CLADDING MATERIALS FOR OPTICAL FIBERS

CROSS REFERENCE TO RELATED APPLICATION

This application is a continuation-in-part of application Ser. No. 720,455, filed Apr. 4, 1985, now abandoned, which in turn is a continuation of application Ser. No. 617,474, filed June 5, 1984 and now abandoned.

FIELD OF THE INVENTION

This invention relates to a cladding material for optical fibers which has outstanding light transmission characteristics and high heat resistance.

BACKGROUND OF THE INVENTION

Optical fibers are well known which comprise a transparent glass or plastic core and a cladding covering the core concentrically therewith and having a lower refractive index than the core material, such that when light incidents on one end of the fiber, light travels through the fiber while being totally reflected in its interior.

Many of the polymers, such as fluoroalkyl methacrylate polymers, have been heretofore proposed for use as plastic cladding materials. However, these methacrylate polymers still remain to be improved in softening temperature, decomposition temperature, refractive index and other properties which are required of cladding materials for optical fibers.

SUMMARY OF THE INVENTION

An object of the present invention is to provide a plastic cladding material for optical fibers which is outstanding in the above-mentioned properties and satisfactory in processability, transparency and flexibility.

Other objects and features of the invention will become apparent from the following description.

The present invention provides an improvement in an optical fiber comprising a cladding and a core wherein said cladding comprises a polymer comprising:

(1) 10 to 100 mole % of a structural unit represented by the formula

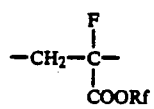

(a)

wherein Rf is a chlorofluorobutyl group, fluoro-lower alkyl group, fluoromethylbenzyl group, fluoromethylcyclohexyl group,

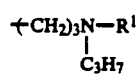

(wherein R¹ is a fluoroheptyl group) or

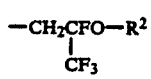

(wherein R² is fluoropropyl group), and (2) up to 90 mole % of at least one structural unit selected from the group consisting of;

(i)

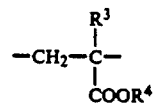

(b)

wherein R³ is hydrogen, fluorine or methyl group and R⁴ is methyl group, phenyl group, cyclohexyl group, trimethylcyclohexyl group or

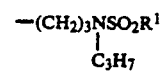

(wherein R¹ is as defined above) and (ii)

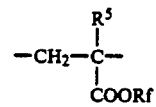

(c)

wherein R⁵ is hydrogen or methyl group and Rf is as defined above.

DETAILED DESCRIPTION OF THE INVENTION

The fluorine-containing polymer used in the invention may be a homopolymer which comprises a structural unit of the formula (a), or a copolymer which comprises a structural unit of the formula (a) and at least one of structural units represented by the formula (b) and (c).

In the invention, said homopolymer may be those wherein the substituents Rf are the same or different and said copolymer may be those wherein the substituent or substituents in each structural unit are respectively the same or different.

The fluorine-containing polymer used in the invention comprising structual units (a) or (a) and (b) and/or (c) can be prepared by homopolymerization of a monomer represented by the formula

(d)

wherein Rf is as defined above, or by copolymerizing the monomer of the formula (d) with a monomer represented by the formula

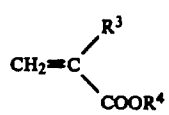

(e)

wherein R³ and R⁴ are as defined above and/or a monomer represented by the formula

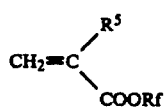

(f)

wherein R⁵ and Rf are as defined above.

When a copolymer is to be prepared, the monomer (d) and at least one of the monomers (e) and (f) are used in such a ratio that the copolymer obtained comprises at least 10 mole % of the former and up to 90 mole % of the latter.

These monomers can be copolymerized with other monomers, such as an alicyclic ester of methacrylic acid, styrene and vinyl chloride, insofar as such monomers do not impair the characteristics of the fluorine-containing polymer for use as a cladding material for optical fibers.

The monomer (c) for preparing the polymer used in the invention can be prepared, for example, by the following process.

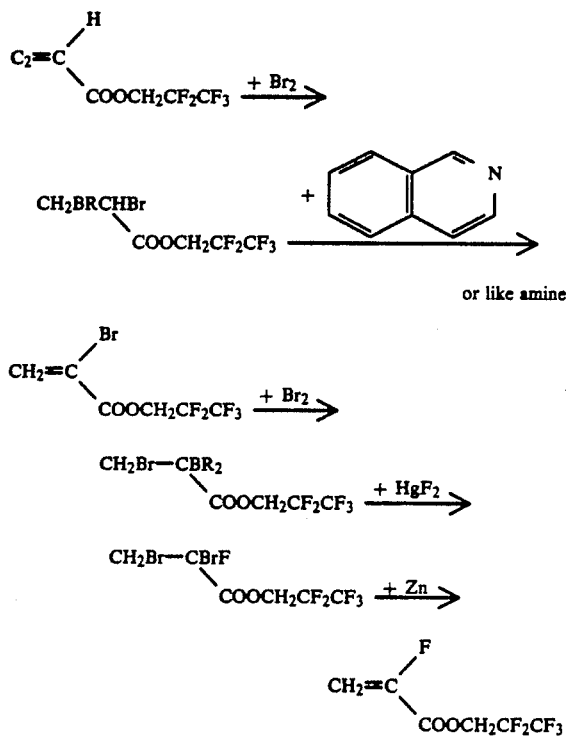

The fluorine-containing polymer used in the invention can be prepared by a usual method or polymerization, e.g. by block, solution, suspension or emulsion polymerization.

Polymerizsation initiators useful for preparing the polymer of the invention are azo compounds and organic peroxides in the case of solution or suspension polymerization, such as azobisisobutyronitrile, isobutyryl peroxide, octanoyl peroxide, di-iso-propylperoxy dicarbonate and fluorine-containing organic peroxides represented by the formulae $[Cl(CF_2CFCl)_2CF_2COO]_2$, $[H(CF_2CF_2)_3COO]_2$ and $(ClCF_2CF_2COO)_2$. Initiators useful for emulsion polymerization are redox initiators including oxidizing agents such as ammonium persulfate, potassium persulfate and like persulfates, reducing agents such as sodium sulfite, and salts of transition metals such as ferrous sulfate.

For block, solution or suspension polymerization, it is desirable to use a mercaptan or like chain transfer agent in order to give a higher thermal decomposition temperature to the polymer of the invention or to adjust the molecular weight thereof. The chain transfer agent is used usually in an amount of about 0.01 to about 1 part by weight per 100 parts by weight of the combined amount of the monomers (d), (e) and/or (f).

Typical of media useful for preparing the fluorine-containing polymer used in the invention by solution or suspension polymerization are dichlorodifluoromethane, trichlorotrifluoroethane, dichlorotetrafluoroethane, trichlorohexafluorobutane and like fluorine-containing solvents, and butyl acetate, methyl isobutyl ketone and like hydrocarbon solvents.

The polymerization temperature, which is usually in the range of from 0° to 100° C., is determined in connnection with the decomposition temperature of the polymerization initiator used. Preferably the temperature is about 10° to about 80° C.

The pressure to be used for polymerization is 0 to about 50 kg/cm² gauge.

The polymers obtained by the foregoing methods of polymerization and useful as cladding materials usually range from about 200,000 to about 5,000,000 in molecular weight as determined by gel permeation method and have a refractive index of about 1.36 to about 1.44 and a softening temperature of about 80° to about 140° C.

The fluorine-containing polymers of the invention are higher in softening temperature than the fluoroalkyl methacrylate polymers which are usually used as plastic cladding materials and are therefore usable at relatively high temperatures, for example, in the engine rooms of vehicles in which the conventional plastic cladding materials are not usable. The polymer of the invention, which has a high decomposition temperature, can be heated to a wider range of temperatures for the melt-spinning of optical fibers. This facilitates the adjustment of the polymer melting temperature.

When the fluorine-containing polymer of the invention is used as a cladding material for optical fibers, the core material to be used in combination therewith is transparent and is usually at least about 3% higher in refractive index than the cladding material. Examples of such core materials are inorganic materials such as quartz and glass, and organic materials such as methacrylate or acrylates polymers, polycarbonates, polybutyl phthalate, polystyrene and heavy hydrogen-substituted compounds of these polymers.

The fluorine-containing polymer of the invention has a low refractive index, high transparency and good flexibility and is useful as an excellent optical material.

The present polymer, which is useful as a plastic cladding material for optical fibers, is also usable for example as organic glass and an additive for weather-resistant coating compositions because the polymer has high impact resistance.

EXAMPLES 1-7

Fluoroalkyl-α-fluoroacrylate (100 parts by weight), which is listed in Table 1 as monomer (d), 0.01 part by weight of azobisisobutyronitrile and 0.05 parts by weight of n-dodecylmercaptan were subjected to block polymerization at 60°-70° C. for 3 hours to obtain a polymer.

The molecular weight of the polymer was measured by gel permeation chromatography at room temperature using a column assembly of "Showdex A-803, A-805 and A-806" (products of Japan Waters, Ltd.), acetonitrile as solvent and polystyrene as standard sample. All the fractions were within the range of 200,000 to 5,000,000 in molecular weight.

The fluorine-containing polymer of the invention was then checked for the following properties. Table 1 shows the results.

(1) Softening temperature (Tg)

Using a differential scanning calorimeter (Model DSC II, product of Perkin Elemer Co.), the temperature at which the polymer started to absorb heat was measured while elevating the temperature at a rate of 20° C./min.

(2) Decomposition temperature ($T_D$)

Using a differential thermobalance (Model DTG-30, product of Shimadzu Seisakusho, Ltd.), the temperature at which the polymer started to decrease in weight was measured while heating the polymer in air at a temperature elevating rate of 10° C./min.

(3) Refractive index ($n_D$)

Measured at 25° C. with Abbe refractometer (product of Atago Kagakukiki Mfg. Co., Ltd.).

(4) Melt index (MI)

A Koka flow tester, manufactured by Shimadzu Seisakusho, Ltd., was used. The polymer was placed into a cylinder having an inside diameter of 9.5 mm, maintained at 250° C. for 5 minutes and thereafter extruded through a nozzle having a length of 8 mm and an orifice diameter of 2.1 mm under a piston load of 7 kg. The amount in gram of the polymer extruded for a period of 10 minutes was measured as MI.

(5) Transmission (Tm)

An optical fiber, 300 μm in diameter and 15 μm in the wall thickness of cladding, was conjugate spun at 250° C. with use of the polymer of the invention as the cladding material and polymethylmethacrylate as the cladding material. The transmission per 500-mm length of the fiber was measured with light 650 to 680 nm in wavelength.

(6) Flexibility (Fb)

The polymer of the invention was extruded by the same method as used for measuring MI, and the extrudate was drawn at 180° C. into a fiber having a diameter of 1 mm. The fiber was wound around round steel rods of varying radii to determine the radius of the rod on which cracks developed in the fiber.

TABLE 1

| Example | Monomer (c)* | Tg (°C.) | $T_D$(°C.) | $n_D$ | MI | Tm (%) | Fb (mm) |
|---|---|---|---|---|---|---|---|
| 1 | —CH$_2$CF$_2$CF$_3$ | 105 | 350 | 1.37 | 131 | 84 | Up to 5 |
| 2 | —CH$_2$CF$_2$CF$_2$H | 103 | 336 | 1.40 | 72 | 78 | Up to 5 |
| 3 | —C(CH$_3$)$_2$CF$_2$CF$_2$H | 125 | 322 | 1.40 | 86 | 82 | Up to 5 |
| 4 | —CH$_2$CF$_2$CFHCF$_3$ | 86 | 313 | 1.38 | 105 | 86 | Up to 5 |
| 5 | —CH$_2$CH(CF$_3$)$_2$ | 111 | 330 | 1.37 | 63 | 83 | Up to 5 |
| 6 | —CH$_2$CF(CF$_3$)$_2$ | 118 | 341 | 1.36 | 60 | 85 | Up to 5 |
| 7 | —CH$_2$CF$_3$ | 104 | 339 | 1.39 | 75 | 81 | Up to 5 |

*The Table shows only the Rf group in each monomer (d).
The optical fibers used for the test for (Tm) showed oven at −20° C. good flexibility comparable with that at room temperature.

EXAMPLES 8-10

Fluorine-containing polymers of the invention were prepared in the same manner as in Examples 1-7 from 2,2,3,3,3-pentafluoropropyl-α-fluoroacrylate (PFPFA) as monomer (d), and methyl methacrylate (MMA) as monomer (e) which were used in the proportions listed in Table 2. The polymers were checked for the above-mentioned properties. Table 2 shows the results.

EXAMPLES 11-14

Fluorine-containing polymers of the invention were prepared in the same manner as in Examples 8-10 from PFPFA as monomer (d) and methyl-α-fluoroacrylate (MFA) as monomer (e) which were used in the proportions listed in Table 3. The polymers were checked for the properties with the results listed in Table 3.

TABLE 2

| Example | PFPFA (wt. parts) | MMA (wt. parts) | Tg (°C.) | $T_D$(°C.) | $n_D$ | MI | Tm (%) | Fb (mm) |
|---|---|---|---|---|---|---|---|---|
| 8 | 80 | 20 | 105 | 330 | 1.39 | 74 | 78 | Up to 5 |
| 9 | 60 | 40 | 105 | 306 | 1.42 | 55 | 75 | Up to 5 |
| 10 | 40 | 60 | 107 | 295 | 1.44 | 86 | 73 | Up to 5 |

TABLE 3

| Example | PFPFA (wt. parts) | MFA (wt. parts) | Tg (°C.) | $T_D$(°C.) | $n_D$ | MI | Tm (%) | Fb (mm) |
|---|---|---|---|---|---|---|---|---|
| 11 | 80 | 20 | 110 | 352 | 1.39 | 103 | 84 | Up to 5 |
| 12 | 60 | 40 | 115 | 331 | 1.41 | 121 | 81 | Up to 5 |
| 13 | 40 | 60 | 120 | 326 | 1.42 | 98 | 78 | Up to 5 |
| 14 | 30 | 70 | 123 | 315 | 1.43 | 86 | 71 | Up to 5 |

EXAMPLE 15

Fluorine-containing polymer (copolymer) was prepared in the same manner as in Examples 8-14 from 50 parts of

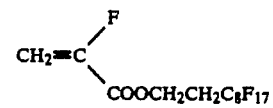

as monomer (d) and 50 parts of methyl-α-fluoroacrylate as monomer (e). The polymer showed Transmission (Tm) as good as 74%.

EXAMPLE 16

An optical fiber, as described in the above item (5) Transmission, was spun with use of the polymer prepared in Example 14 as the cladding material and methyl-α-fluoroacrylate, which was prepared in the same manner as in Examples 1-7, as the core material.

The optical fiber thus prepared was checked for properties. The results revealed that: transmission (Tm) was as good as 86%, no crack developed and no change of transmission was observed in the fiber when checked for flexibility by 500-times repetition of a cycle of winding the fiber around a steel rod of 10 mm in diameter and rewinding therefrom, and no reduction in the length of fiber was occured after the fiber was allowed to stand in an atmosphere at 120° C. for 10 hours.

COMPARISON EXAMPLE

A polymer was prepared in the same manner as in Example 1-7 except that 2,2,3,3,-tetrafluoropropylmethacrylate was used in place of fluoroalkyl-α-fluoroacrylate as monomer (d).

The polymer was found to have softening temperature of 72° C., decomposition temperature of as low as 265° C. and refractive index of 1.42.

An optical fiber was spun at 250° C. with use of the polymer obtained above as the cladding material and polymethylmethacrylate as the core material to find formation of voids in the cladding. At 210° C., spinning could not be continued due to clogging of nozzle. At 230° C., was obtained an optical fiber having transmission of 76%. However, the transmission of the fiber reduced to 52% when allowed to stand in an atmosphere at 85° C. for 100 hours. Further, there occurred cracks in the fiber when wound on a steel rod of 10 mm in diameter at −20° C.

EXAMPLES 17-21

Fluorine-containing polymers of the invention were prepared in the same manner as in Examples 8-10 from two kinds of α-fluoroacrylate listed in Table 4.

The polymers obtained were respectively dissolved in a solvent as listed in Table 4 to prepare a solution of 10 wt. % concentration. Through the resulting solution was passed a polymethylmethacrylate fiber at a speed of 30 cm/min to produce coated fiber. After drying, the fibers were tested for transmission. The results are shown in Table 4 below.

TABLE 4

| Example | α-fluoroacrylate (parts by weight) | | | Solvent (parts by weight) | Tm (%) |
|---|---|---|---|---|---|
| 17 | $-CH_2CF_2CFClCF_2Cl$ | (10) | $-CH_2CF_2CF_3$ (90) | Ethylacetate (100) | 71 |
| 18 | $-(CH_2)_3N-C_7F_{15}$<br>　　　　　$\|$<br>　　　　　$C_3H_7$ | (1) | $-CH_2CF_3$ (99) | Ethylacetate (100) | 81 |
| 19 | $-CH_2CFOC_3F_7$<br>　　　$\|$<br>　　　$CF_3$ | (20) | $-CH_2CH_2F$ (80) | Ethylacetate (50)/ R-113 (50) | 73 |
| 20 | $-CH_2-\bigcirc-CF_3$ | (20) | $-(CH_2)_2C_8F_{17}$ (80) | Ethylacetate (50)/ R-113 (50) | 72 |
| 21 | $-\bigcirc-CF_3$ (cyclohexyl) | (30) | $-(CH_2)_2C_8F_{17}$ (70) | Ethylacetate (50)/ R-113 (50) | 70 |

The table shows only the Rf group in each α-fluoroacrylate.
R113 represents 1,1,2-trichlorotrifluoroethane.

EXAMPLES 22-29

Fluorine-containing polymers were prepared in the same manner as in Examples 8-10 with use of α-fluoroacrylate and methacrylate listed in Table 5.

An optical fiber was spun from each of the polymers prepared above in the same manner as in Examples 17-21. The fibers were tested for transmission (Tm). The results are shown in Table 5.

TABLE 5

| Example | α-fluoroacrylate (parts by weight) | | Methacrylate (parts by weight) | | Solvent (parts by weight) | Tm (%) |
|---|---|---|---|---|---|---|
| 22 | $-CH_2CH_2CF_3$ | (10) | cyclohexyl | (90) | Ethylacetate (100) | 76 |
| 23 | $-CH_2CF_2CF_3$ | (90) | cyclohexenyl | (10) | Ethylacetate (100) | 73 |
| 24 | $-CH_2CF_2CF_3$ | (90) | $-CH_2CF_2CFClCFCl$ | (10) | Ethylacetate (100) | 71 |

TABLE 5-continued

| Example | α-fluoroacrylate (parts by weight) | | Methacrylate (parts by weight) | | Solvent (parts by weight) | Tm (%) |
|---|---|---|---|---|---|---|
| 25 | —CH$_2$CF$_2$CF$_3$ | (90) | (trimethylcyclohexyl CH$_3$/CH$_3$/CH$_3$) | (10) | Ethylacetate (100) | 78 |
| 26 | —CH$_2$CF$_3$ | (80) | —CH$_2$CF(CF$_3$)CF$_3$ | (20) | Ethylacetate (100) | 83 |
| 27 | —CH$_2$CF$_3$ | (20) | —C(CH$_3$)(CH$_3$)CF$_2$CF$_2$H | (80) | Ethylacetate (100) | 82 |
| 28 | —CH$_2$CF$_3$ | (80) | —(CH$_2$)$_3$NSO$_2$C$_7$F$_{15}$ (C$_3$H$_7$) | (20) | Ethylacetate (50)/ R113 (50) | 81 |
| 29 | —CH$_2$CF$_3$ | (80) | —CH$_2$CF(CF$_3$)OC$_3$F$_7$ | (20) | Ethylacetate (100) | 77 |

The table shows only the Rf and R groups in each

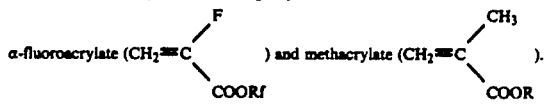

α-fluoroacrylate (CH$_2$=C(F)(COORf)) and methacrylate (CH$_2$=C(CH$_3$)(COOR)).

EXAMPLES 30-34

Polymers of the invention were prepared in the same manner as in Examples 8-10 by copolymerizing 70 parts by weight of pentafluoropropyl-α-fluoroacrylate and 30 parts by weight of 2,2,3,3-tetrafluoropropyl-α-fluoroacrylate (intrinsic viscosity (y)=0.72; solvent: methylethylketone; at 35° C.).

Each of the polymer was dissolved in methylethylketone to prepare a solution of 10% by weight in concentration. Through the solution was passed the core material listed in Table 5 in the same manner as in Examples 17-21. The optical fibers thus obtained were tested for Tm. The results are shown in Table 6.

TABLE 6

| | Core material and properties thereof | | | |
|---|---|---|---|---|
| Example | Core Material | Tg (°C.) | n$_D$ | Tm (%) |
| 30 | Quartz | — | 1.46 | 93 |
| 31 | Polymethylmethacrylate | 105 | 1.49 | 84 |
| 32 | Polystyrene | 85 | 1.59 | 72 |
| 33 | Polycarbonate | 135 | 1.59 | 78 |
| 34 | 3,3,5-Trimethyl cyclohexyl methacrylate | 140 | 1.51 | 81 |

EXAMPLES 35-36

The monomers listed in Table 7, 0.05 parts by weight of azobisisobutyronitrile and 0.1 part by weight of dodecylmercaptan were subjected to block polymerization at 60° C. for 6 hours to obtain polymers.

The polymers were checked for the properties of Tg, n$_D$, MI, Tm and Fb in the same manner as in Examples 1-7. Table 7 shows the results.

TABLE 7

| Example | monomers (parts by weight) | Tg | n$_D$ | MI | Tm | Fb |
|---|---|---|---|---|---|---|
| 35 | CH$_2$=CFCOOCH$_3$ (10) CH$_2$=CFCOOCH$_2$CF$_3$ (90) | 120 | 1.39 | 76 | 82 | up to 5 |
| 36 | CH$_2$=CHCOOCH$_3$ (1) CH$_2$=CFCOOCH$_2$CF$_3$ (85) CH$_2$=CHCOOCH$_2$CF$_3$ (15) | 108 | 1.39 | 110 | 81 | up to 5 |

We claim:

1. In an optical fiber comprising a cladding and a core, an improvement wherein the cladding comprises a polymer comprising:

(1) 10 to 100 mole % of a structural unit represented by the formula

wherein Rf is a chlorofluorobutyl group, fluorolower alkyl group, fluoromethylbenzyl group, fluoromethylcyclohexyl group,

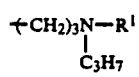

(wherein R$^1$ is a fluoroheptyl group) or

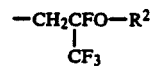

(wherein R² is fluoropropyl group), and
(2) up to 90 mole % of at least one structural unit selected from the group consisting of;
(i)

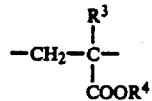
(b)

wherein R³ is hydrogen, fluorine or methyl group and R⁴ is methyl group, phenyl group, cyclohexyl group, trimethylcyclohexyl group or

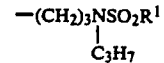

(wherein R¹ is as defined above) and
(ii)

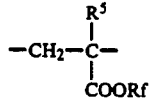
(c)

wherein R⁵ is hydrogen or methyl group and Rf is as defined above.

2. In an optical fiber comprising a cladding and a core according to claim 1 wherein the polymer forming the the cladding has a molecular weight of about 200,000 to 5,000,000, a refractive index of about 1.36 to about 1.44 and a softening point of about 80° to about 140° C.

* * * * *